Figure 1:
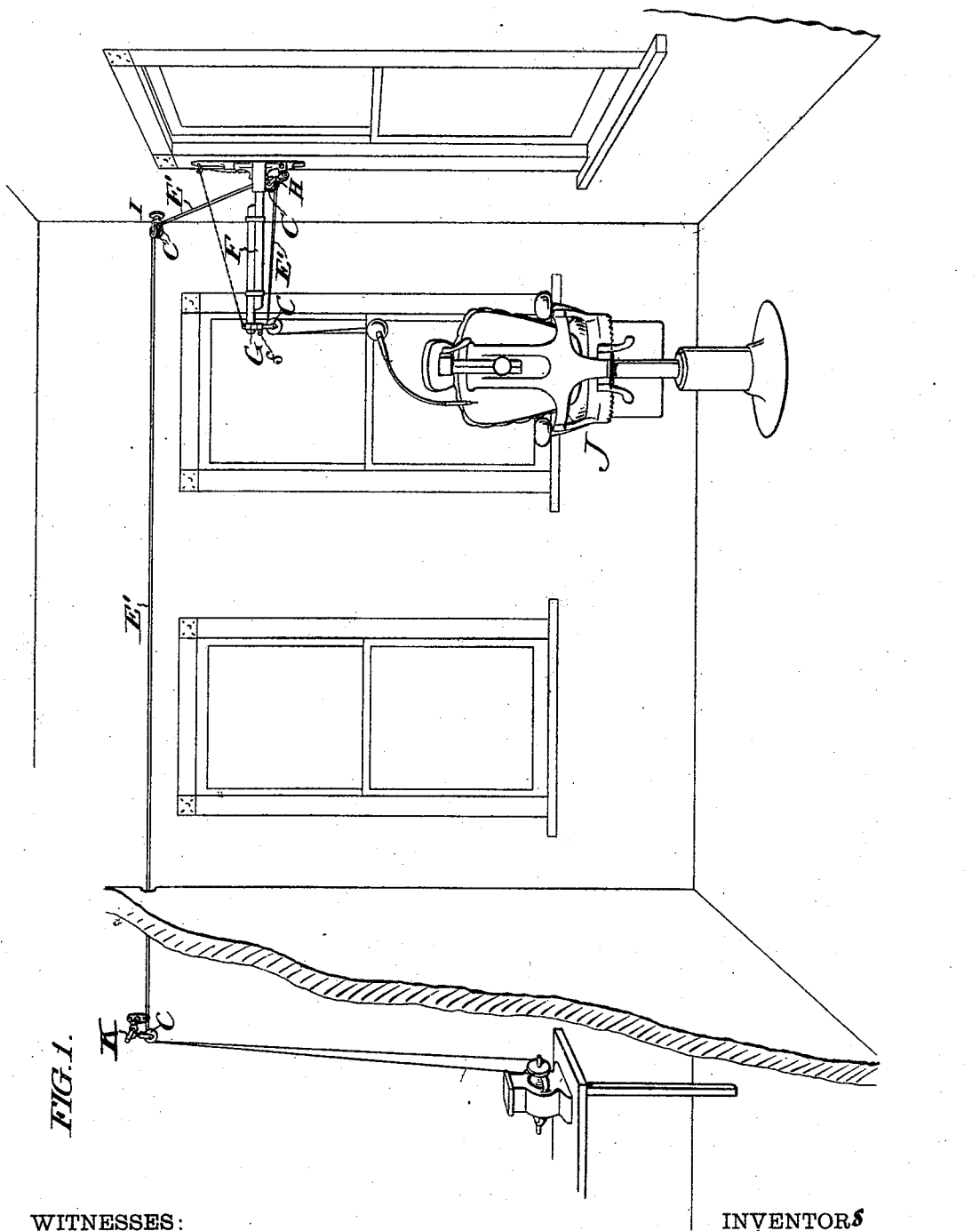

(No Model.) 2 Sheets—Sheet 1.

W. A. JOHNSTON & A. W. BROWNE.
DENTAL ENGINE.

No. 501,075. Patented July 11, 1893.

WITNESSES: INVENTORS

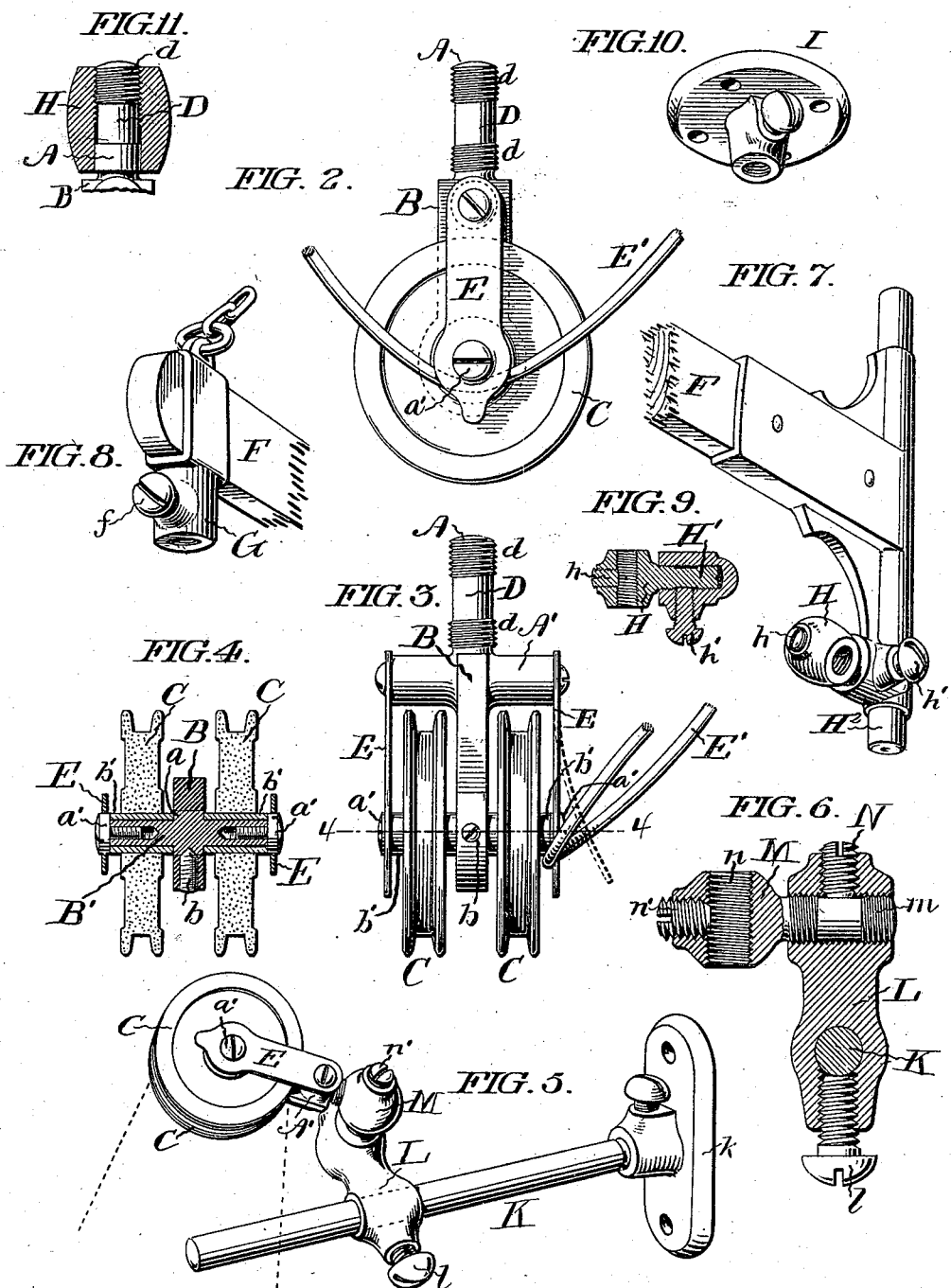

UNITED STATES PATENT OFFICE.

WILLIAM A. JOHNSTON AND ARTHUR W. BROWNE, OF PRINCE'S BAY, NEW YORK, ASSIGNORS TO THE S. S. WHITE DENTAL MANUFACTURING COMPANY, OF PHILADELPHIA, PENNSYLVANIA.

DENTAL ENGINE.

SPECIFICATION forming part of Letters Patent No. 501,075, dated July 11, 1893.

Application filed March 16, 1893. Serial No. 466,377. (No model.)

*To all whom it may concern:*

Be it known that we, WILLIAM A. JOHNSTON and ARTHUR W. BROWNE, both of Prince's Bay, in the county of Richmond and State of New York, have invented certain new and useful Improvements in Dental Engines, of which the following is a specification.

This invention relates to certain improvements, as hereinafter claimed, applicable to suspension dental engines.

In the accompanying drawings Figure 1 is a view in perspective showing a suitable organization of our improvements. Figs. 2 and 3 are views in elevation at right angles with each other of the improved pulley block. Fig. 4 is a section through the pulley block on the line 4 of Fig. 3. Fig. 5 is a view in perspective showing the pulley block and a supporting bracket rod with which it is adjustably connected. Fig. 6 is a section showing the means by which the pulley block and the supporting bracket rod therefor are adjustably connected. Figs. 7 and 8 show, respectively, views in perspective of the inner and outer ends of the adjustable bracket arm of the engine. Fig. 9 is a section showing the means by which the inner end of the bracket arm is adapted to support the pulley block. Fig. 10 is a view in perspective of a modified form of pulley block carrier. Fig. 11 is a view of a portion of a pulley block having a shank and carrier modified in construction.

A pulley block frame consisting of a supporting shank A, cross arm A', and hanger arm B, is provided with a shaft B' removably secured in the hanger arm by a set screw b. The cord guide pulleys C, C, are mounted to rotate about the shaft B', with their hubs b' abutting against the centrally enlarged or shouldered part a of the shaft; while headed screws a' a' secured to the ends of the shaft hold the pulleys in position. The supporting shank of the pulley block frame is made of different diameters for different portions of its length, being shouldered or enlarged, provided with screw threads upon its inner and outer portions d d of the larger diameter, and unthreaded upon its intermediate portion D, of the smaller diameter, between its shouldered portions. This shank may, however, be provided with a screw thread upon its outer enlarged portion only, as shown in Fig. 11. The supporting shank of the pulley block frame provided with the threaded and unthreaded portions is adapted to be screwed into a suitable socket as farther on described and engaged by a set screw at its reduced unthreaded portion, thus avoiding injury to the screw threads. Yielding cord guards E E of spring metal are each secured at one end to one end of the cross arm A' of the pulley block frame, by means of a screw, and at their opposite or free ends embrace the heads of the screws a' a' which keep the pulleys in place, the guards being formed with holes in their ends to fit about the screw heads, or, it may be, about the pulley hubs inside of the screw heads, depending upon the set of the guards.

As will be understood upon reference to Figs. 2, 3 and 4, the driving cord E' may readily be engaged with its guide pulleys C C by springing the cord guards outward at their free ends, and then working the cord up over the pulleys, while in event of the cord running off a pulley it will be held connected with the pulley block by the cord guard so that it may readily be again engaged with the pulley.

A suitable extensible swinging bracket arm F is provided at its outer end with a carrier G for a pulley block having a supporting shank such as shown in Figs. 2 and 3 and above described, this shank being screwed by its threads d d into a threaded socket or opening in the carrier. A set screw f passing through the carrier is adapted to be engaged with the reduced unthreaded portion of the shank of the pulley block frame. It will be seen that the pulley block may be left free to swivel in its carrier or be locked against such movement.

Provision is made for mounting another similarly constructed pulley block at the inner end of the bracket arm in the following way:— The carrier H is provided with the threaded opening for the shank of the pulley block frame, which has the threaded and unthreaded portions as before explained, and the set screw $h$ serves to lock the shank against turning in the carrier, when desired. The carrier H has a shank H' provided with an interrupted screw thread like that of the shank of the pulley block frame, which engages a threaded socket formed with the pintle or pivot $H^2$ of the bracket arm. The set screw $h'$ serves to lock the shank of the pulley block carrier in its socket when desired. A pulley block carrier I adapted for attachment to either a wall, window frame, or ceiling is shown as secured to the wall above the bracket arm, and a pulley block is attached by its shank to the threaded socket of this carrier which is provided with a set screw as before explained. The remaining pulley block of the series for the driving cord is shown as secured to the wall of a room adjacent to that in which the bracket arm and the operating chair J are located. The carrier for this last pulley block is sectional, and is adjustably attached to a supporting bracket rod K, the attaching plate $k$ of which serves to secure it in place. The inner section L of this carrier is adapted to rock and slide upon the rod K, and to be secured in desired position by a set screw $l$. The outer section M of the carrier extends at a right angle to the inner section which is provided with a threaded socket engaged by the screw of the shank $m$ of the outer section. The set screw N may be adjusted to bite upon the unthreaded portion of the shank $m$ if swiveling movement of the outer section of the carrier is not desired. This outer section is provided with a threaded socket $n$ at a right angle with its shank, and into this socket the supporting shank of the pulley block is screwed. The set screw $n'$ may be adjusted to bite upon the unthreaded portion of the shank or not, according to whether the pulley block is to be left to swivel or to be fixed after proper adjustment. By means of this sectional carrier it will be seen that universal adjustment of the pulley block is provided for.

The driving cord passes about the various pulleys above referred to and about a pulley for actuating a flexible shaft, as in this instance shown, so as to impart rotary motion to a suitable tool, as will readily be understood. The driving cord has motion imparted to it in suitable way, as by an electric motor as represented in Fig. 1, which when the engine is not in use may be used for other purposes.

It will be seen that by our improvements the driving cord may pass between the motor and swinging bracket arm at any desired angle by way of the different cord guide pulleys, without interfering with the free running of the cord, thus enabling the dentist to locate the operating chair, bracket, and motor in the most convenient positions.

When only the outer enlarged portion of the supporting shank of the pulley block is threaded, as shown in Fig. 11, the carrier socket is made with a thread for only a suitable portion of its length to receive the supporting shank, a set screw for engaging the reduced unthreaded portion of the supporting shank being provided as before. The shouldered or enlarged unthreaded portion at the inner end of the supporting shank fits snugly and so as to turn freely in the unthreaded end of the carrier socket.

We claim as our invention—

1. The pulley block frame provided with the supporting shank shouldered or enlarged and partly screw-threaded, and having the unthreaded reduced portion, substantially as and for the purpose set forth.

2. The combination of the cord guide pulleys, the pulley block frame in which they are mounted, provided with the supporting shank shouldered or enlarged and partly screw-threaded and having the unthreaded reduced portion, a carrier having the socket into which the supporting shank is screwed, and the set screw adapted to engage with the reduced unthreaded portion of said shank, substantially as and for the purpose set forth.

3. The combination of the cord guide pulleys, the pulley block frame having the shaft for said pulleys, and the yielding cord guards by which to hold the driving cord connected with the pulley block frame in event of its running off a pulley, substantially as set forth.

4. The combination of a pair of cord guide pulleys, the pulley block frame provided with the supporting shank shouldered or enlarged and partly screw-threaded, and having the unthreaded reduced portion, the supporting bracket rod, the sectional carrier each part of which has a threaded socket and the inner section of which is adjustably secured to the supporting bracket rod and provided with the set screw and the threaded socket for engagement with the shouldered or enlarged and partly screw-threaded shank of the outer section, and the set screw of the outer section adapted for engagement with the unthreaded portion of the supporting shank of the pulley block frame, which shank screws into the socket of the outer section, substantially as set forth.

In testimony whereof we have hereunto subscribed our names.

WILLIAM A. JOHNSTON.
ARTHUR W. BROWNE.

Witnesses:
SEYMOUR CASE,
IRVING DECKER.